(12) United States Patent
Reinosa et al.

(10) Patent No.: US 10,913,019 B2
(45) Date of Patent: Feb. 9, 2021

(54) APPARATUS FOR PROVIDING SUPPLEMENTAL ADVANCED FILTRATION

(71) Applicants: Adan Reinosa, Montebello, CA (US);
Laura M. Reinosa, Montebello, CA (US)

(72) Inventors: Adan Reinosa, Montebello, CA (US);
Laura M. Reinosa, Montebello, CA (US)

( * ) Notice: Subject to any disclaimer, the term of this patent is extended or adjusted under 35 U.S.C. 154(b) by 0 days.

(21) Appl. No.: 15/932,414

(22) Filed: Feb. 27, 2018

(65) Prior Publication Data

US 2018/0296952 A1 Oct. 18, 2018

Related U.S. Application Data

(60) Provisional application No. 62/600,721, filed on Feb. 27, 2017.

(51) Int. Cl.
*B01D 35/157* (2006.01)
*F01M 1/10* (2006.01)
(Continued)

(52) U.S. Cl.
CPC ....... *B01D 35/1576* (2013.01); *B01D 35/005* (2013.01); *B01D 35/147* (2013.01);
(Continued)

(58) Field of Classification Search
CPC .................... B01D 35/005; B01D 35/306
See application file for complete search history.

(56) References Cited

U.S. PATENT DOCUMENTS

| 4,174,699 A * | 11/1979 | Gill | B01D 35/147 |
| | | | 123/196 A |
| 4,193,442 A * | 3/1980 | Vian | B01D 35/18 |
| | | | 165/300 |

(Continued)

OTHER PUBLICATIONS

Donaldson Company, Inc., Full Flow Lube Filters for Cummins ISX Engines, brochure, Apr. 2015, pp. 1-6 of 8 pages, F113026 ENG, Donaldson Company, Minneapolis, MN, USA.

(Continued)

*Primary Examiner* — Benjamin M Kurtz

(57) ABSTRACT

The present invention teaches a method and apparatus to quickly and inexpensively implement advanced, bypass grade, fine, or additional filtration to engines and hydraulic systems. The present invention has the ability to make quick hydraulic connection to the engine or hydraulic system, where oil is super cleaned, without major modifications as is the paradigm by traditional bypass filtration systems and without removing any lubricant from the engine or system that the present invention is connected to, as is the paradigm of traditional bypass filtering systems. When connected to the normally provided stud for the spin-on oil filter in an engine or hydraulic system, the net effect of interest to the present invention is that by simply placing the adapter at the point of connection of the spin-on oil filter, many of the necessary plumbing associated with the traditional bypass filter installation is obviated, as is the energy and labor intensive process of seeking for a pressure point and a return of the oil. The present invention relies on the differential pressure effected by either alone or in combination of an orifice restriction to effect flow of either engine oil or hydraulic fluid, to route through a high efficiency filter, in trapping and low pressure to flow, an amount of dirty oil and then to return same amount to reconstitute a total flow on the (Continued)

system, whereby supplemental or advanced filtration is quickly connected to an engine or hydraulic system.

6 Claims, 2 Drawing Sheets

(51) Int. Cl.
    *B01D 35/00*           (2006.01)
    *B01D 35/147*         (2006.01)
    *F15B 21/041*         (2019.01)

(52) U.S. Cl.
    CPC ....... *F01M 1/10* (2013.01); *F01M 2001/1057* (2013.01); *F01M 2001/1092* (2013.01); *F15B 21/041* (2013.01)

(56) References Cited

U.S. PATENT DOCUMENTS

| | | | | |
|---|---|---|---|---|
| 5,236,064 A * | 8/1993 | Wagoner | ............... | B01D 35/306 123/196 A |
| 5,327,862 A * | 7/1994 | Bedi | .................... | B01D 35/306 123/196 R |
| 5,957,240 A * | 9/1999 | Apostolides | ......... | B01D 35/306 184/1.5 |

OTHER PUBLICATIONS

Donaldson Company, Inc., Filter Media Technology, brochure, Jan. 2012, pp. 1, 10, 11 of 16 pages, F111300 (1/12), Donaldson Company, Minneapolis; MN, USA.

\* cited by examiner

APPARATUS FOR PROVIDING SUPPLEMENTAL ADVANCED FILTRATION

CROSS-REFERENCE TO RELATED APPLICATIONS

This application is entitled to the benefits of Provisional Patent Application Ser. No. 62/600,721 filed on Feb. 27, 2017.

BACKGROUND OF THE INVENTION

The present invention relates to a new and quick method and apparatus to achieve bypass advanced filtration or supplemental filtration in engines or any hydraulic equipment using a spin-on oil filter where installation time is dramatically reduced and simplified, with no modifications, fewer parts, and lower labor.

DESCRIPTION OF PRIOR ART

Background

Bypass filtration is a well known field and many devices have been proposed to achieve fine oil filtration. Engines, and hydraulic systems in industrial processes and other applications, require for their proper performance and longevity a degree of oil or hydraulic filtration that is a compromise between the size of the particles to be captured by the normally provided filter element, be it canister type, spin-on or other media arrangement, and the required flow of the fluid for the proper performance and longevity of the machine or system being protected. In the lubrication system of automobile engines, and other hydraulic systems, there is normally provided a motor oil or hydraulic fluid filter described as a full flow filter. The full flow filter must flow an adequate oil or hydraulic fluid volume and therefore the size of the particles that it traps cannot be too small or the risk of starvation of lubricant to the engine is a possibility, with catastrophic consequences to the engine or hydraulic system. Therefore, most full flow filters, be it canister type or spin-on filters, trap particles in the order of 25 to 40 microns in cross sectional area and above in an efficient manner. However, studies have pointed out that particles in the range of 2 to 15 microns are the most harmful to the engine due to the thickness of the lubricating film between rotating partners inside an engine. A similar case can be made in other systems such as hydraulic systems in industrial processes and other fluids such as Diesel or gasoline filters where the flow of the fluid can be intercepted by the present invention to quickly insert complementary or fine filtration.

It is now apparent that in order to stop or reduce the mechanical degradation of an engine or hydraulic system, the particles that the full flow filter or other filter media does not trap must be removed by other means since in the presence of the full flow filter, in either engines or hydraulic systems, these particles move around the lubrication or hydraulic system unfettered and behave like liquid sandpaper with respect to rotating or sliding partners in an engine or hydraulic or fuel system. In addition to the mechanical degradation caused by these particles, some particles are actually damaging to the lubricant in question degrading the additive package that renders lubricants ineffective in protecting the engine and its components. These additives get depleted because contaminant particles react chemically if they are left in suspension and dispersant additives are taxed by their presence, and these processes result in increased viscosity of the oil where parasitic pumping energy and rotational energy losses are increased accordingly. Yet another mode of degradation is the reaction of these particles that create acids and deplete the additives degrading what is widely regarded as an indication of the health of the oil, the Total Base Number, or TBN, which is a measure of how well the oil would protect the engine against the presence of acids in the oil. These acids eventually damage parts by pitting the working surfaces, among other damages. In a hydraulic system, the removal of finer particles is a benefit of finer filtration to prevent or reduce equipment degradation.

For example, the advent and increasing popularity of Diesel engines makes this type of filtration much mule attractive since most Diesel pollution controls rely on a process known as Exhaust Gas Recirculation, or EGR, in order to control the amount of polluting tailpipe emissions. This process, although effective for the control of pollution, taxes the oil by loading it with soot particles that find their way to the lubricating oil by means of blowby around piston rings of an engine, increasing oil viscosity and accordingly, parasitic energy losses. It is clear that the current filtration left alone to the functions and capabilities of the full flow filter leaves much to be desired and that an additional filtration device is needed in order to protect the machinery and systems that are being lubricated. A way to protect against this shortcoming is by the use of bypass filtration.

Bypass filtration is a proven and effective technology where traditionally a portion of total flow is diverted from the full flow filter and passed through a filter that has a higher filtering capability and then returning it to the engine usually to the crankcase or oil filler cap in a vehicle. These systems are popular in big rigs, or class 8 vehicles, in spite of being costly, difficult to install and maintain. However, the payback of such systems is assured considering the investment and the benefits returned due to their high mileage accrued during operation, which can be in the order of 100,000 miles in a year and even more in some cases. An insignificant number of passenger vehicles are equipped with these systems because of their cost, complex installation and maintenance. However, the benefits of Bypass Filtration, or Advanced Filtration, through research by the US Department of Energy, Argonne Laboratory, SAE and others, yields an impressive array of benefits, among them: oil life extended up to 10 times, oil filter full flow extended from 3 to 5 times, emissions reduced by up to 15% due to reduced friction and parasitic energy losses, and fuel efficiency increases in the order of 3 to 5%. In addition to the benefits described above some other important benefits are less engine component wear with lower overhaul costs, a better performing engine over its operating life, better resale value, and when adopted in great scale it would benefit our country's position with respect to foreign oil dependency. In spite of all the benefits, the complexity of installation and its cost are the main reasons why this current technology is not widely implemented in vehicles used by the general public and government fleets until the advent of the present invention where the cost of manufacture and installation has now been dramatically reduced.

The current methodology of connecting a bypass system is first connecting it to the oil pressure supply in an engine, usually found through a "tee" connection at the oil pressure sending unit. In some cases, this process requires a great expense since the oil pressure sending unit is usually buried right beneath the intake manifold in most modern engines, and even in older engines it is in a most remote location, making searching for the "tee" and plumbing of the system a costly and labor intensive proposition. In addition to that, the return of the purified oil, once the pressure side has been secured, must be done through modifications either to the sump plug at the bottom of the engine, which complicates future oil changes, or return the oil through the oil filling cap, again requiring modification and possible release of contaminants to the environment through shoddy installation.

The present invention solves all problems mentioned above through an apparatus where installation needs minimum modifications to connect the apparatus. As can be appreciated, there is a significant body of prior art in this field that has been built over many years to achieve bypass filtration to engines and systems, representative of this prior art are the following US patents: U.S. Pat. No. 4,452,695, to Schmidt for a full-flow and bypass filter conversion system for internal combustion engines; U.S. Pat. No. 7,090,773, to Meddock and Swanson for a Coaxial full-flow and bypass oil filter; U.S. Pat. No. 6,951,606, to Cousineau and Allen for an Auxiliary filtration system. More illustrative examples for combining full flow and high density filtering have been integrated in one single unit, such as shown in Dahm, et al., U.S. Pat. No. 4,036,755. However, such a filtering system is not made in such a manner that is easily connected to the standard engine filtering system. Also, the high density portion of the filtering would only operate for a much shorter period of time before it would become clogged and the entire flow would then flow through the full-flow portion. Upon clogging of the full-flow portion, the by-pass valve would open and the oil would receive essentially no filtering. The same basic comments are true concerning Belgarde, et al., U.S. Pat. No. 2,995,253. Likewise, Beardsley, U.S. Pat. No. 2,680,520 shows a full-flow and part-flow filter combination. It has the same inherent problems as the previously described full-flow and part-flow filters. These problems may be exhibited by a recently developed combination full flow and a bypass grade Teflon sintered disc, with a rather small loading area for the bypass section, generously estimated to be limited to a cross section of the filter, such as U.S. Pat. No. 6,605,215, to Assion for, again, a Hybrid spin-on oil filter, and U.S. Pat. Nos. 7,048,848, 8,123,942, and 8,241,494 to Assion for, again, a Hybrid spin-on oil filter and similar configurations. These four patents describe a laudable and ingenious interpretation of an old idea whose execution fails to recognize the increased loading of contaminants and the small loading and service capacity of such, while still not fully addressing the environmental impact inherent in spin-on oil filters related to their illegal dumping and disposal. Yet other examples such as Kennedy, U.S. Pat. No. 2,843,268 is simply another variation of the combination full-flow, part-flow filter that also has the problems of life cycle and the pressure drop that can be utilized in the filtering system itself. Belgarde, U.S. Pat. No. 2,929,605, is simply another modification of the combined full-flow and part-flow oil filter. Allen, U.S. Pat. No. 2,966, 296 again shows a combined full-flow and by-pass filter with strainer mounted in one single contiguous housing with only one by-pass valve. Further, U.S. Pat. Nos. 8,623,218, 8,623,219, and 8,409,435 to Kenneth L. Geiger, teaches a complicated apparatus and systems that achieve at great complexity and cost an incremental benefit to the simple present invention.

In U.S. Pat. No. 5,178,753 Trabold describes an oil filter for internal combustion engines that is used in a secondary oil circuit in addition to a conventional oil filter. The oil filter includes a filter housing in which a filter element consists of a roll of absorbent paper that is wound about a rod. The oil filter is configured as a set of elements that comprises body sections and caps, and a rod with the rolled filter element. The volume of the oil filter can be matched to a particular application by connecting a plurality of body sections with an appropriate number of rods.

In U.S. Pat. No. 5,556,543 Trabold describes an oil filter for internal combustion engines. The oil filter includes a filter housing and a filter packing made of a porous deformable material, e.g., a roll of absorbent paper. To prevent the filter packing from being deformed and thereby preventing a smooth flow through the filter packing, stabilizing elements, e.g., stabilizing bars, are provided for fixing the form and position of the filter packing within the filter housing.

Other examples can be found in U.S. Pat. No. 6,666,968, to Smith et al. for a Fluid filtration apparatus; U.S. Pat. No. 8,945,400, to Reinosa for a Method and apparatus for a parallel bypass filtration system for internal combustion engines and similar systems; U.S. Pat. No. 5,843,284, to Waters et al. for Two-stage oil bypass filter device, and U.S. Pat. No. 5,695,637, to Jiang et al. for a Combination full flow and bypass filter with venturi nozzle.

A long-felt and unfulfilled need exists to provide an oil filter assembly for an internal combustion engine and hydraulic systems that provides bypass grade fine filtration capable of entrapping and, thus, removing smaller particles from the oil than the conventional oil or hydraulic filter.

SUMMARY OF THE INVENTION

The present invention seeks and provides complementary bypass grade filtration, also known as advanced filtration, to engines or hydraulic equipment in a novel fashion by taking advantage of commonalities and well known structures such as those found in spin-on full flow oil filters and canisters. The typical bypass grade installation, as illustrated by prior art, is on the one hand a very intensive process for energy, material and labor. There is still the need to install the system at a point of high oil pressure from the system to be protected. However, the place where this pressure point is obtained is usually buried among other components, such as getting it from the oil pressure sending unit, where a point of connection can be made but at the high expense of labor and time, which translates to cost. In addition, once the pressure side is located and installed, a return to the oil has to be provided. This oil return is either to the bottom of the oil sump, requiring again material, labor and modifications, or return the oil to other location such as the oil filler cap, again requiring modifications to the system. Yet, on the other hand, an alternate solution proposes the replacement of the spin-on oil filter with a combination of full flow and a small bypass grade filter elements in combination, having the compromise of small loading areas, short service interval, and the uncertainty of its performance since there is no way to get feedback, such as tactile or visual.

The present invention therefore enjoys advantages over previous art: quick installation, inexpensive to manufacture and maintain, simple connection, large filtering loading area for a long service interval, small size, multifunctional, proven technology, no need to divert or sidestream oil from the engine or hydraulic system as traditional bypass systems require.

The present invention requires only a single hydraulic connection to access a hydraulic point in the engine lubrication system or hydraulic system. For example, in spin-on oil filter equipped engines or hydraulic systems the apparatus of the present invention can use a sandwich adapter that is installed between the spin-on oil filter and the engine block to access the lubrication system. It uses a nipple adapter to install the sandwich adapter. The nipple has the ability to affix the adapter to the engine in order to access the oil flow output from the normally provided pump and to route said oil flow output into the normally provided engine gallery or system and to a remote filter, while at the same time providing an attachment means to the normally equipped spin-on oil filter. In hydraulic systems, the present invention can be simply installed in a similar manner to provide complementary bypass filtration or additional regular filtration.

When connected to the normally provided stud for the spin-on oil filter in an engine, the net effect of interest to the present invention is that by simply placing the adapter at the point of connection of the spin-on oil filter, many of the necessary plumbing associated with the traditional bypass filter installation is obviated, as is the energy and labor intensive process of seeking for a pressure point and an oil return path back to the engine.

By accessing the lubrication system of the engine or the hydraulic system, the adapter can now redirect a part of the total flow from the engine to the special complementary bypass filter head where said part of the total flow from the engine oil pump is admitted into the inflow port. The sandwich adapter is equipped with at least one through flow orifice and two ports that connect to a remote filter head equipped to house a bypass grade filter and having both an intake and exhaust ports.

Once said total flow from the engine oil pump or hydraulic fluid flows toward the engine side of the adapter it encounters at minimum a mild obstruction modeled as an orifice restriction. This mild obstruction or restriction forces the total flow to split into at least two flows: one that goes through the restriction, a through flow orifice, and another that is diverted, due to the pressure differential created by the restriction, through a path that is forced to flow through a much more efficient filter than the normally provided filter for the system. Once the diverted fluid or oil goes through the high efficiency filter media it rejoins the flow through said through flow orifice to reconstitute the total flow and into the engine via the sandwich adapter or to the hydraulic system. The high efficiency filter enjoys low pressure drop across it media element due to its construction and it is therefore more energy efficient than the traditional counterpart of traditional system requiring a high pressure gradient to effect flow across it. In either case, the rating of said high efficiency filter is desired to be within a range down to below one micron to 50 microns in cross-sectional area. It is also desirable to have said filter endowed with chemicals or/and additives that can be time released to lengthen the oil or hydraulic fluid service interval.

Also, by observing that the working oil will flow across the element, a temperature gauge can be placed in the circuit, or at the bypass grade filter element, where it can serve as an analog signal to the health and loading condition of the supplemental bypass filter element. Given those reasons above, the present invention is more resourceful, functional, and its strategy of connection leads it to be more readily accepted by the buying public, saving time, labor, the environment, and our domestic natural resources, where doing more with less is the new paradigm.

It is clear to the inventors that this simple device may be of wide acceptance by the public due to its benefits and its low cost, size, no moving parts, manufacturing simplicity and installation and therefore its widespread acceptance would have a positive impact in reducing the consumption of natural resources, increased fuel savings, less consumption of filters, lower emissions, and it is expected that the system will translate into green house gasses reductions, for which the value and trade credits have not been determined as of this writing; however, the applicant claims such future credits as part of the present invention and those will be further described in future claims.

DETAILED DESCRIPTION OF THE DRAWINGS

Figures 1, 2:
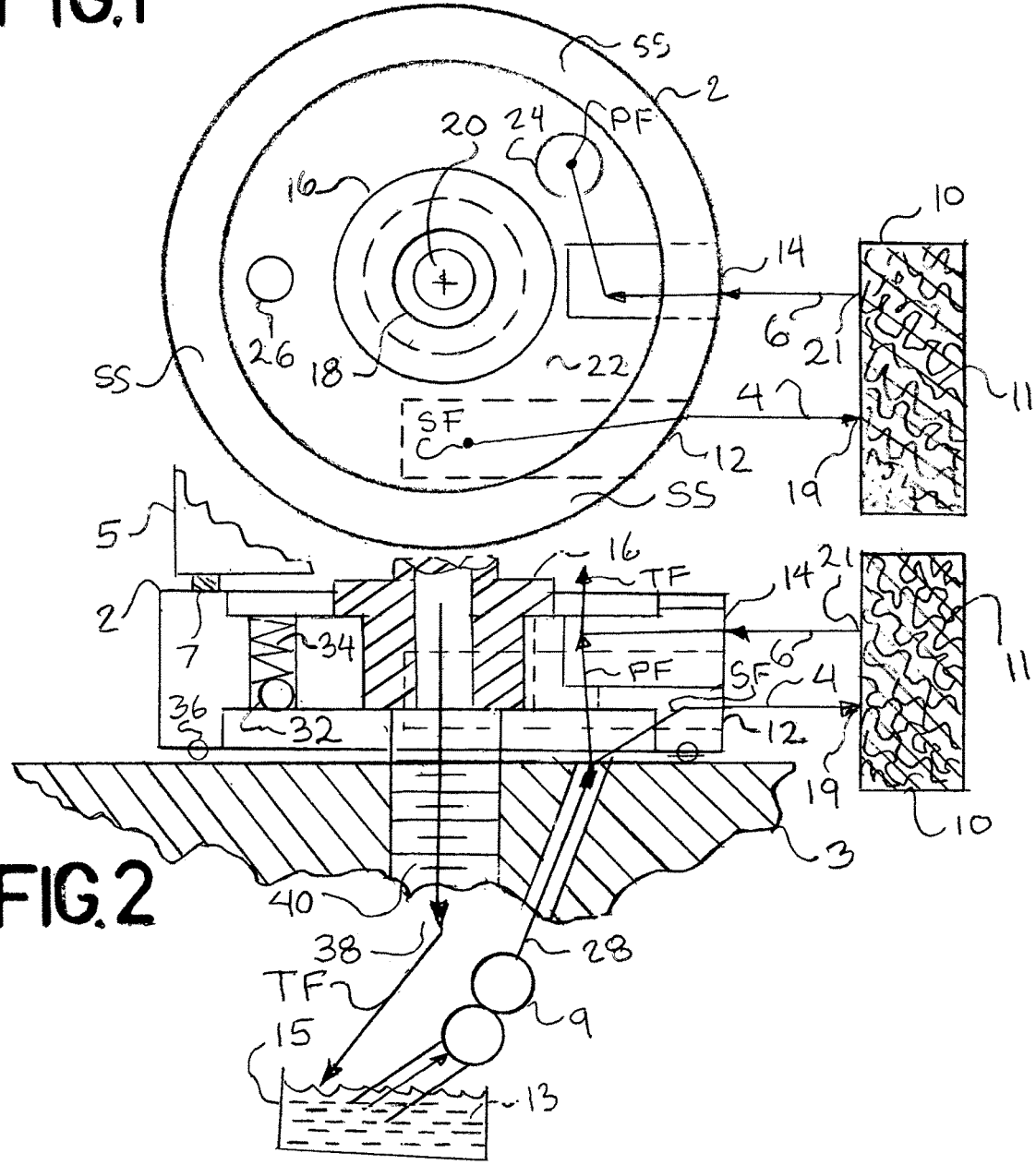
FIG. 1 Is a schematic representation of the main components and hydraulic flows of the present invention.
FIG. 2 Is a detailed side and top views showing in more detail the structures of the present invention and hydraulic flows FIG. 3 Is a detail side view of the adapter nipple that affixes the present invention adapter to the normally provided engine oil filter nipple

Referring to FIG. 2, it shows a side and top view of the present invention showing an adapter 2 that is interposed between a normally provided spin-on oil filter 5, partly shown as it is a very well known structure in the art, and an engine 3, said adapter 2 receives from its engine side an oil flow 28 that is normally provided by an engine oil pump 9, normally and in the absence of adapter 2, oil flow 28 would be normally channeled to and through filter 5, and when adapter 2 is in place oil flow 28 is split into at least two flows, a secondary flow SF and a primary flow PF.

Now referring to FIG. 1, it shows a schematic representation of said flows PF and SF and the structures that make up the present invention, still referring to FIG. 1, said adapter 2 is equipped with, at least one, a Through Flow Orifice TFO that channels said primary flow PF towards the normally provided filter 5, adapter 2 channels the secondary flow SF toward a filter head 8 equipped with a high efficiency filter 10, said adapter 2 is fluidly connected to filter head 8 by two conduit means, a conduit means 4 and a conduit means 6 that channels the secondary flow SF to and from adapter 2 by an outlet port 12 and an inlet port 14 and connects to and inlet 19 and outlet 21 of the high efficiency filter 10 and filter head 8 combination respectively.

Still referring to FIG. 1, placing adapter 2 between the filter 5 and the engine 3 generates a pressure differential between a pump side hydraulic point A and a filter side hydraulic point G, where the secondary flow SF experiences a trajectory AbcdefG, said secondary flow SF experiencing high efficiency filtration through filter 10 equipped with a high efficiency filter media 11 and returns as a super clean secondary flow SF' via conduit means 6 and joins the primary flow PF to constitute a total flow TF which is the same volume as oil flow 28.

Still referring to FIG. 1, in the absence of the present invention, filter 5 would filter total flow TF to its micron filter rating at 100% rate. However, by installing the present invention, a volume of oil 13 normally contained by a normally provided oil sump 15 of engine 3 would be filtered continuously by a ratio SF/TF, where flow SF is made to pass through the high efficiency filter 10, and therefore the normally provided volume of oil 13 would be super cleaned continuously during a short period of time.

Now referring to FIG. 2, the adapter 2 is affixed to engine 3 by an adapter nipple 16 that not only affixes adapter 2 to engine 3 but also provides a point to affix filter 5 which seals against adapter 2 by a sealing means 7 and against a sealing surface SS of adapter 2 which in turn also seals against engine 3 by a sealing means 36.

Figure 3:
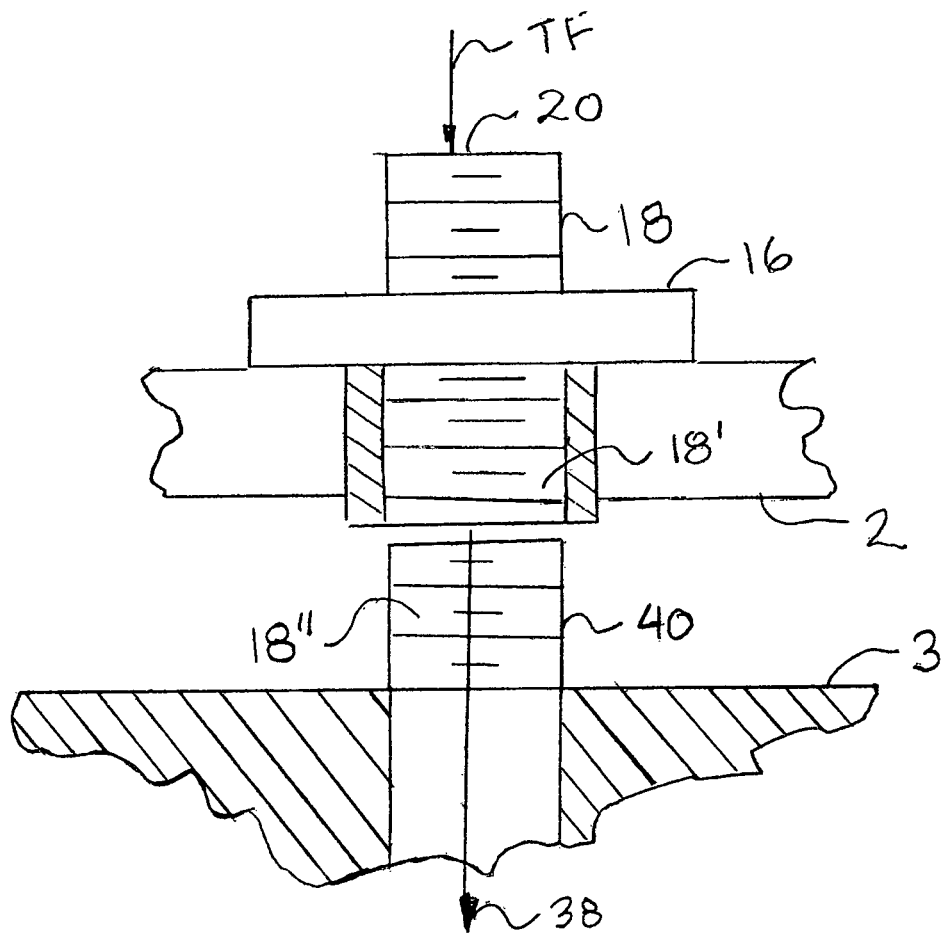

Now referring to FIG. 3, it shows adapter nipple 16 which is equipped with a central channel 20 that channels total flow TF towards engine 3. The nipple 16 has the ability to affix, locate, and help seal adapter 2 to engine 3 and is also equipped with a thread 18 and a thread 18'. Both threads 18 and 18' are of the same pitch and diameter as a normally provided engine oil filter nipple 40 having a nipple thread 18" so that nipple 16 can match and easily, quickly, and without modifications affix adapter 2 to said engine 3 since threads 18, 18' and 18" are all the same.

Now referring to FIG. 2, adapter 2 is also equipped with a bypass valve orifice 26, bypass valve orifice 26 can be a ball bearing 32 biased by a calibrated spring 34 to open upon a predetermined calculated pressure for the purposes of routing flow 28 towards filter 5 in case orifice TFO and flow SF stop flowing due to clogging to prevent catastrophic failure of engine 3 due to lubricating oil starvation, bypass valve 32 is also indicated as a bypass valve BV in FIG. 1.

It is now clear to those skilled in the art that the orifice TFO in FIG. 1, which is the same as an orifice 24 in FIG. 2, can be made of smaller diameter, equipped with a check valve of different opening pressures to bias different differential pressures between said points A and G, augmented in numbers, placed near said inlet port 14 as shown in FIG. 2 to effect a Venturi effect, or even equipped with a electronically controlled variable diameter orifice to bias the differential pressure between hydraulic points A and G in FIG. 1.

It will be understood that each of the elements described above, or two or more together may also find a useful application in other types of methods differing from the type described above.

While certain novel features of this invention have been shown and described and will be pointed out in future claims, it is not intended to be limited to the details above, since it will be understood that various omissions, modifications, substitutions and changes in the forms and details of the device illustrated and its operation can be made by those skilled in the art without departing in any way from the spirit of the present invention.

We claim:

1. An apparatus for providing supplemental filtration, said apparatus comprising:
   an adapter body substantially shaped like a flat cylinder, said adapter body defining a top flat sealing surface, a bottom flat sealing surface, and a circular external surface, said adapter body further comprising:
   a centrally located circular bore,
   a single restriction orifice; said single restriction orifice open at both ends communicating said top flat sealing surface to said bottom flat sealing surface, the single restriction orifice defined radially inward between said circular bore and said circular external surface,
   an outlet port emerging through said circular external surface in communication with the bottom flat sealing surface,
   an inlet port emerging through the circular external surface in communication with the top flat sealing surface,
   said apparatus further comprising:
   a filter head equipped with a filter,
   a first conduit communicating said outlet port to a filter head inlet port,
   a second conduit communicating said inlet port to a filter head outlet port,
   an adapter nipple having a set of internal threads, a set of external threads, a central channel, and
   a seal provided to said bottom flat sealing surface, wherein during use a pressure differential is generated across said outlet port and said inlet port due to the single restriction orifice, said pressure differential generating a continuous oil flow across the filter, whereby supplemental filtration is provided by said apparatus.

2. The apparatus of claim 1, wherein said single restriction orifice has a cross sectional area smaller than the central channel cross sectional area.

3. The apparatus of claim 1, wherein said filter is a high efficiency filter, said high efficiency filter having filtering efficiencies in a range of 1 to 50 microns.

4. The apparatus of claim 1, wherein said single restriction orifice is placed next to said inlet port to generate a Venturi effect at said inlet port.

5. The apparatus of claim 1, wherein said filter is endowed with time released additives.

6. The apparatus of claim 1, wherein a bypass valve orifice is defined radially inward between said circular bore and said circular external surface of said adapter body where upon reaching a predetermined calculated pressure, the bypass valve orifice opens to hydraulically communicate said top flat sealing surface to said bottom flat sealing surface.

* * * * *